Patented Feb. 16, 1943

2,311,341

UNITED STATES PATENT OFFICE 2,311,341

PLASTICIZING AMINO-FORMALDEHYDE RESINS

William B. Johnston, Stamford, Conn., assignor to American Cyanamid Company, New York, N. Y., a corporation of Maine No Drawing. Application July 19, 1940, Serial No. 346,325

11 Claims. (Cl. 260—33)

This invention relates to plasticizing amino-aldehyde resins, such as urea-aldehyde resins, aminotriazine-aldehyde resins, thiourea-aldehyde resins, dicyandiamide-aldehyde resins, etc.

An object of this invention is to provide plasticizers for various amino resins of the type mentioned which are substantially non-volatile and water-insoluble. Another object of this invention is to provide plasticizers which are not only non-volatile and water-insoluble, but are also non-saponifiable.

These and other objects are attained by using as a plasticizer for any of the various amino resins a high molecular weight polyhydric alcohol or esters thereof, said alcohol being obtained by polymerizing a polyene fatty acid or, more preferably, an ester of a polyene fatty acid at elevated temperature and converting the polymer to the corresponding alcohol by hydrogenolysis. In this way, glycols containing 36 carbon atoms and trihydric alcohols containing 54 carbon atoms or their esters are obtained. My new plasticizers are particularly suitable for use in coating compositions containing a urea-formaldehyde resin, an aminotriazine-formaldehyde resin, e. g., a melamine-formaldehyde resin, etc.

The following examples in which the proportions are in parts by weight are given by way of illustration and not in limitation. For convenience, the polyhydric alcohols obtained from polyene fatty acids are designated as A, B, C and D and the esters of such alcohols as E and F. The preparation of these substances is described in detail following the examples.

Example 1

| | Parts |
|---|---|
| Alcohol mixture A | 170 |
| Butylated urea-formaldehyde resin (40% solids) | 850 |
| Xylene | 400 |

These substances are mixed and the resultant composition is applied as a coating to various materials such as steel objects. The coating is dried and stoved at a temperature of about 130° C. for about one-half hour. A hard, tough relatively mar-resistant coating of water-white color is obtained. The coating has good flexibility and excellent adhesion to the metal. Similar results are obtained if a melamine-formaldehyde resin can be plasticized with alcohol mixture A. Of course, the melamine-formaldehyde resin compositions are inherently more light-stable and more chemically resistant than the urea-formaldehyde resin. In many instances, it may be desirable to use mixed melamine-urea-formaldehyde resins and my plasticizers are also quite suitable for such materials.

Example 2

| | Parts |
|---|---|
| Alcohol mixture B | 170 |
| Butylated urea-formaldehyde resin (40% solids) | 850 |
| Xylene | 400 |

This mixture is applied as a coating and baked in the same general manner as described in Example 1. Again a light-colored coating which has good water- and alkali-resistance is obtained. Similar results are obtained if other amino resins such as melamine-formaldehyde resin be plasticized with alcohol mixture B.

Example 3

| | Parts |
|---|---|
| Alcohol mixture C | 200 |
| Butylated melamine-formaldehyde resin (50.7% solids) | 800 |
| Xylene | 400 |

This mixture is applied as a coating and baked in the same general manner as described in Example 1. Again a light-colored coating which has good water- and alkali-resistance is obtained. Similar results are obtained if other amino resins such as urea-formaldehyde resin be plasticized with alcohol mixture C.

Example 4

| | Parts |
|---|---|
| Glycol mixture D | 200 |
| Butylated melamine-formaldehyde resin (50% solids) | 800 |
| Xylene | 400 |

This mixture is applied as a coating and baked in the same general manner as described in Example 1. Again a light-colored coating which has good water- and alkali-resistance is obtained. Similar results are obtained if other amino resins such as urea-formaldehyde resin be plasticized with glycol mixture D.

Example 5

| | Parts |
|---|---|
| Ester mixture E (or ester mixture G) | 250 |
| Butylated urea-formaldehyde resin (40% solids) | 750 |
| Xylene | 400 |

This mixture is applied as a coating and baked in the same general manner as described in Example 1. Again a light-colored coating which has good water- and alkali-resistance is obtained. Similar results are obtained if other amino resins such as melamine-formaldehyde resin be plasticized with ester mixture E or ester mixture G.

Example 6

| | Parts |
|---|---|
| Ester mixture F (or ester mixture G) | 200 |
| Butylated melamine-formaldehyde resin (40% solids) | 800 |
| Xylene | 400 |

This mixture is applied as a coating and baked in the same general manner as described in Example 1. Again a light-colored coating which has good water- and alkali-resistance is obtained. Similar results are obtained if other amino resins such as urea-formaldehyde resin be plasticized with ester mixture F or ester mixture G.

Preparation of alcohol mixture A 800 parts of the methyl esters of tung oil fatty acids are heated, preferably in an atmosphere of carbon dioxide or other inert gas, to a temperature of about 300° C. in approximately 40 minutes and the temperature is maintained at this point for about one-half hour. The relatively volatile and unpolymerized esters are removed by distillation at about 1-5 mm. of mercury absolute pressure, the temperature being gradually raised to about 300° C., leaving a residue containing 415-420 parts of non-volatile polymerized esters.

To 200 parts of the polymerized esters thus obtained 20 parts of copper chromite catalyst are added and the mixture is placed in a suitable pressure vessel and charged with hydrogen to a pressure of about 1900 pounds per square inch. The temperature is raised to about 450° C. and maintained at that point for around 14 hours, during which time the pressure decreases from about 3200 pounds per square inch (the pressure attained after heating to 250° C.) to 1600 pounds per square inch as a result of hydrogen absorption. The reaction vessel is cooled and the excess hydrogen is released. The product may be diluted with a small amount of a suitable solvent, e. g., acetone, to decrease the viscosity and the catalyst may then be conveniently removed by filtration. The acetone is evaporated from the filtrate and about 10 parts of acid-treated bentonite ("Filtrol") are added, the resulting mixture is agitated and the temperature is raised to about 120° C. for 20 minutes. The mixture is filtered hot and the filtrate which is obtained is a viscous straw-colored liquid containing a mixture of polyhydric alcohols.

Preparation of alcohol mixture B 200 parts of the methyl esters of the fatty acids of soya-bean oil are mixed with 200 parts of activated bentonite ("Super-Filtrol") and the mixture is heated, preferably in an inert atmosphere at about 280° C. for about one-half hour. The product is filtered and the volatile and unpolymerized esters are removed by distillation at 1-5 mm. of mercury absolute pressure, the temperature being gradually raised to about 300° C., leaving as a residue about 835-840 parts of polymerized esters. The polymerized esters thus obtained are hydrogenated in the presence of a copper chromite catalyst as described in the preparation of alcohol mixture A and the hydrogenated product is purified in the same manner as that set forth above.

Preparation of alcohol mixture C 1000 parts of the methyl esters of the fatty acids of dehydrated castor oil, the major proportion of which are the methyl esters of 9,11- and 9,12-octadecadienic acid, are polymerized at 300° C. for about 5 hours in an inert atmosphere. The volatile and unpolymerized esters are removed by distillation at temperatures up to 300° C. at 1-5 mm. of mercury absolute pressure, leaving as a residue about 650-660 parts of substantially non-volatile polymerized esters.

300 parts of the polymerized esters thus obtained are hydrogenated in the presence of about 20 parts of copper chromite catalyst in the same manner as described in the preparation of alcohol mixture A. The hydrogenated product may be purified by filtration as set forth above, thus producing a pale straw-colored liquid of slightly lower density and viscosity than that obtained according to the preparation of alcohol mixture A.

Preparation of glycol mixture D

A crude mixture of polyhydric alcohols prepared in accordance with the preparation of alcohol mixture C is distilled at temperatures varying between 100° C. and 290° C. and at a pressure of about 2 microns of mercury absolute pressure in a molecular still. This still is preferably one of the cyclic type. For a description of stills of this general type, as well as the cyclic still, reference is made to the patent of Oosterhof et al. No. 2,065,728, of December 29, 1936, and to the article by Hickman, entitled "Apparatus and Methods," Ind. & Eng. Chem., 29, 968 et seq. (1937). The following fractions and properties are obtained:

| Fraction | Per cent yield | $n/D$ 25° C. | Sp. g., 25° C./25 | Viscosity poises, 25° C. | Rast mol. wt. | Sap. No. | Hydroxyl No. 1 hr. reflux | 2 hr. Kaufmann iodine No. |
|---|---|---|---|---|---|---|---|---|
| A | | 1.4824 | 0.9105 | 46.3 | | 11.4 | 198 | 19.3 |
| 1 | 4.2 | 1.4705 | | Solid, waxy. | | 3.5 | 198 | 6.6 |
| 2 | 8.2 | 1.4788 | 0.9030 | Turbid paste. | | 5.4 | 198 | 11.6 |
| 3 | 30.4 | 1.4817 | 0.9068 | Sl. turbid—27.0. | 480 | 5.1 | 200 | 11.2 |
| 4 | 18.4 | 1.4821 | 0.9098 | 36.2 | 495 | 4.8 | 200 | 11.0 |
| 5 | 5.4 | 1.4830 | 0.9108 | 46.3 | 507 | 4.8 | 198 | 13.6 |
| 6 | 5.2 | 1.4857 | 0.9165 | | 530 | 2.5 | 190 | 23.6 |
| B | 17.9 | 1.4884 | 0.9223 | 148.0 | 816 | 13.6 | 178 | 27.4 |

A=original crude mixture.
B=undistilled residue.

An ultra-violet absorption spectra of each fraction indicates that fraction No. 4 is most nearly homogeneous and an ultimate analysis showed:

| | Per cent |
|---|---|
| Carbon | 80.65 |
| | 80.96 |
| Hydrogen | 13.28 |
| | 13.29 | and molecular refraction, 168.4. The theoretical for the fully saturated glycol (IV), $C_{36}H_{70}(OH)_2$, is C=80.52%, H=13.51%, molecular refraction, 167.6 and for the corresponding mono-unsaturated glycol (III) of iodine number 47.5 and composition $C_{36}H_{68}(OH)_2$ is C=80.82%, H=13.19%, molecular refraction, 167.2. This fraction contains 2.5% of ester impurity and is indicated to comprise a mixture of approximately 77.2% of the saturated glycol (IV), $C_{36}H_{70}(OH)_2$ and 20.3% of the corresponding glycol, $C_{36}H_{68}(OH)_2$ (III) containing one double bond per mol. This fraction is designated as glycol mixture D.

Preparation of ester mixture E 100 parts of alcohol mixture A are heated with 13 parts of succinic acid to about 200° C. in one hour and maintained at this temperature for about 6 hours. A viscous light-colored liquid of relatively low acid number is obtained.

Preparation of ester mixture F 100 parts of alcohol mixture C are admixed with about 13 parts of tricarballylic acid and heated at about 200° C. for 4–12 hours. The polyester obtained is relatively light-colored and may be used as a plasticizer as described in Example 6.

Preparation of ester mixture G 53 parts of glycol mixture D are heated with about 15 parts of phthalic anhydride at 200° C. for about 16 hours. A pale, straw-colored polyester having an acid number of 6–7 is obtained.

While the structure of the polyhydric alcohols which are used as plasticizers according to my invention has not been definitely established, the following discussion and structural formulae are believed to accurately portray the actual state of fact. In illustration of the most probable chemistry involved and of the general type of structure of the polyhydric alcohols employed here (yet without specific limitation thereto), the several steps in the preparation of mixture C may be considered to progress as follows:

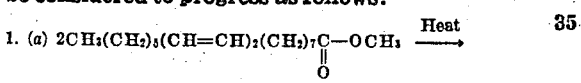

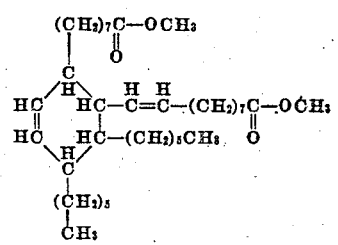

2 mols methyl ester 9,11-octadecadienic acid (originally present and/or formed by isomerization of 9,12 isomer)

I

Dimerized ester

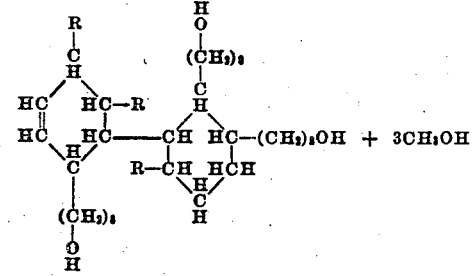

II

Partially saturated dimerized ester

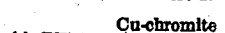

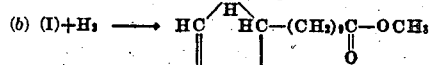

+2CH₃OH methanol

III

Unsaturated glycol
$C_{54}H_{96}(OH)_2$

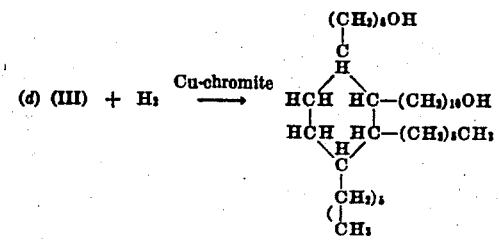

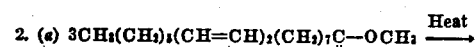

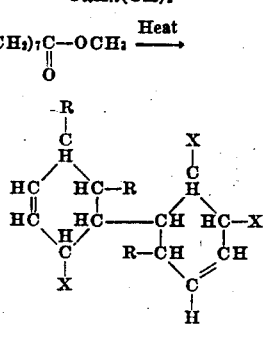

3 mols methyl octadecadienate (linoleate)

V

Trimer ester where $R=CH_3(CH_2)_5$
$X=(CH_2)_7C{-}OCH_3$
$\quad\quad\quad\quad\quad\|$
$\quad\quad\quad\quad\quad O$

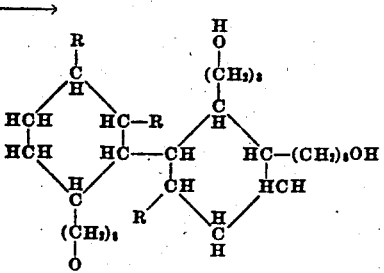

VI

Half saturated trimer alcohol
$C_{54}H_{104}(OH)_3$
where $R=CH_3(CH_2)_5$

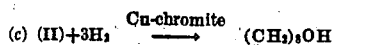

VII

Saturated trimer alcohol
$C_{54}H_{106}(OH)_3$
where $R=CH_3(CH_2)_5$

The physical constants and characteristics of these new polyhydric alcohols are those of cyclized molecules of the indicated structure rather than of straight chain molecules of comparable molecular weights. The latter are generally wax-like solids rather than viscous liquids.

The polyhydric alcohol in alcohol mixture A is characterized by a greater density and viscosity yet not of greater molecular weight than those obtained in alcohol mixtures B and C, in common with those which have been derived from linolenic or other esters of the octadecatrienic acids, and is thought to exhibit such differences because of a bi-cyclic hydronaphthalene configuration rendered possible by the higher initial degree of unsaturation of the reactants. The exact configuration of this glycol, as in the preceding case, is not definitely known but it is thought most likely to be that of Figure VIII, or isomeric therewith:

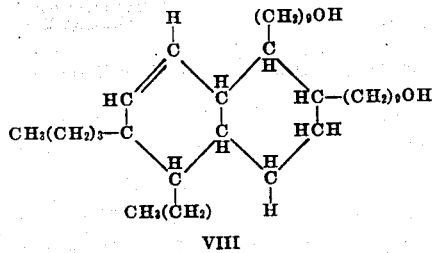

VIII

Glycol (from methyl eleostearate dimer)
$C_{36}H_{66}(OH)_2$

Any polyene fatty acid or its esters or mixtures thereof in any desired proportion or as they happen to occur in the natural drying oils may be treated in the same manner as set forth in the above examples to produce polyhydric alcohols. The most important of these are the octadecadienic or octadecatrienic acids or their esters, but the polymeric fatty acids containing 20, 22 and 24 carbon atoms found in fish oils are also suitable, as well as the relatively short chain aliphatic fatty acids, e. g., sorbic acid.

The lower monohydric alcohol esters of the polyene carboxylic acids are preferred, but the acids themselves, as well as the glycol esters and the glycerides, may be used. The acids themselves may tend to decompose, particularly at the carboxyl groups and therefore may be less desirable from a commercial point of view. On the other hand, the glycerides and, to a lesser extent, the glycol esters tend to gel before the polymerization reaction is completed. Accordingly, only small yields are usually obtainable. Even aromatic or heterocyclic esters may be used, such as the benzyl or furfuryl esters, but in general there is no particular advantage in their use. While the higher aliphatic alcohol, for example, stearyl alcohol, esters may be employed, it has generally been found that somewhat better results are obtained if the lower aliphatic alcohol esters be used. Accordingly, the preferred esters are those derived from methanol, ethanol, propanol, etc.

Examples of the polyene fatty acids, the esters of which are polymerized and then subjected to hydrogenolysis, are the following: 9,11- and/or 9,12-octadecadienic acids (obtainable from soyabean oil and dehydrated castor oil), linolenic acid (obtainable from perilla oil, linseed oil and other drying oils), alpha- and beta-eleostearic acids (obtainable from tung oil), etc.

If esters of the polyene fatty acids be employed, such esters may be produced by direct esterification of the fatty acid with the alcohol which has been selected, but it is generally more economical and more convenient to produce the esters by mixing the alcohol with a natural drying oil, together with a trace of alkali hydroxide, hydrogen chloride or other esterification catalyst and thereby effect an alcoholysis or ester interchange by simply heating.

If methyl or ethyl esters of the polyene acids be utilized, I have found that temperatures between about 250° C. and about 350° C. are suitable for the polymerization. The time required for this polymerization varies not only with the temperature but with the acid and the particular ester which is used. Generally a period of from about one-half hour to about 50 hours is suitable and in most instances, the polymerization may be effected in not over 12 hours. If a conjugated unsaturated ester, such as the methyl ester of eleostearic acid be employed, a sufficient degree of polymerization may be obtained within one-half to one hour at about 300° C., whereas the methyl linolenates and linoleates generally require from about 5 to 12 hours or more. To speed up the polymerization process, suitable catalysts may be added, examples of which are: fuller's earth (preferably acid-treated), bentonite (preferably acid-treated), stannic chloride, etc. If catalysts be employed, it is sometimes possible to use lower temperature and/or shorter periods of time than those indicated above.

In general, I prefer to conduct the polymerization in an inert atmosphere of carbon dioxide, nitrogen or other inert gas. The polymerization is preferably continued until the refractive index, density and average molecular weight approach constant values. At this point the polymerized esters are separated from the unpolymerized esters by any suitable method. In the above examples I have suggested the separation of these esters by distilling off the unpolymerized esters at an absolute pressure of about 1–5 mm. of mercury and at temperatures up to about 300° C. Another way in which this separation may be effected is by extraction with methanol or other suitable solvent. This separation or purification step may be omitted if a product be desired containing a mixture of alcohols, i. e., not only the polyhydric alcohols which are the subject of this invention, but also monohydric alcohols, such as stearyl alcohol. Such mixtures are of use for reaction with carboxylic and other acids as in the preparation of resinous materials and for many other purposes. Generally the crude polymerized esters contain about 30% to about 75% of polymeric esters.

The polymerized esters are hydrogenated to convert them into the corresponding alcohols by hydrogenolysis, thereby obtaining polyhydric alcohols having the same number of carbon atoms as the acid radicals of the polymeric esters. The hydrogenation may be carried out in any ordinary high pressure hydrogenation equipment and either by the static or continuous flow methods. In order to effect the conversion of the polymeric ester into a polyhydric alcohol, a hydrogenolysis catalyst is necessary. The complex copper chromite catalysts have been found to be the most desirable, although other catalysts of the same type may be used, e. g., zinc chromite catalysts. In general, a reaction temperature of 200–250° C. and a hydrogen pressure of 100–500 atmospheres is suitable in carrying out this reaction. In some instances, it may be desirable to hydrogenate the polymeric ester in the presence of an ordinary hydrogenation catalyst, e. g., a nickel catalyst, to saturate the carbon to carbon double bonds prior to a second hydrogenation with a chromite catalyst to effect the hydrogenation of the ester group. In this way, the characteristics of the final products may be varied to some extent for various purposes.

Obviously the mixtures of polyhydric alcohols or the esters thereof which are usually obtained may be fractionated or otherwise separated and the individual components used in the same manner as the mixtures used in the above examples.

The process of producing the polyhydric alcohols which are employed herein, as well as the alcohols themselves and the properties thereof, are set forth in detail in my copending application entitled "High molecular weight polyhydric alcohols and processes of producing the same," Serial No. 338,282, filed May 31, 1940.

The process of producing the esters of polyhydric alcohols which are employed herein, as well as the esters themselves and the properties thereof, are set forth in detail in my copending application entitled "Esters of high molecular weight polyhydric alcohols and processes of producing the same," Serial No. 340,840, filed June 15, 1940.

The polyhydric alcohols may be esterified with any suitable inorganic acid, monocarboxylic acid or polycarboxylic acid. Examples of these are: boric acid, phosphoric acid, sulfuric acid, hydrogen halides, particularly hydrogen chloride, formic acid, acetic acid, propionic acid, butyric acid, valeric acid, capric acid, caproic acid, 2-ethyl hexoic acid, decanoic acid, dodecanoic acid (lauric acid), linoleic acid and linolenic acid, alpha- and beta-eleostearic acids, benzoic acid, phthalic acid, succinic acid, adipic acid, pimelic acid, azelaic acid, sebacic acid, brassylic acid, endomethylene tetrahydrophthalic anhydride, etc. Compounds of particular utility may be produced by esterifying the alcohols with an acid obtained by polymerizing an acid or ester in accordance with the procedure used in producing the alcohols and saponifying if necessary to produce the acid. The hydroxy acids, for example, alpha-hydroxy isobutyric acid, tartaric acid, lactic acid, omega-hydroxy decanoic acid, etc., may be utilized in the same way as the acids mentioned above. Obviously various mixtures of any of the acids may be employed. The corresponding acid anhydride may be employed when available and/or expedient and accordingly, the term "acid" as used herein is intended to cover not only the acid itself, but also the corresponding anhydride if available.

Mixed esters may be produced according to my invention by adding other alcohols, monohydric or polyhydric, to the high molecular weight alcohols which are described above. Among the alcohols which may be added as modifiers are the following examples: methanol, ethanol, propanol, butanol, amyl alcohol, allyl alcohol, cyclohexanol, citric alcohol, stearyl alcohol, ethylene glycol, di-, tri-, tetra-, penta-, hexa-, octa-, deca- and dodeca-ethylene glycols, octadecanediol, alpha-propylene glycol, 1,3-butylene glycol, etc.

The alkyd resins or polyesters may be modified with fatty oils or drying oil acids, e. g., linseed oil, tung oil, oiticica oil, perilla oil, soya-bean oil, castor oil, olein, stearin, etc., all in accordance with the general practice in the alkyd resin art.

In conducting the esterification of my high molecular weight polyhydric alcohols it is sometimes preferable to employ an esterification catalyst, e. g., hydrogen chloride, phosphoric acid, stannic chloride, stannic chloride dioxanate, p-toluene sulfonic acid, benzene sulfonic acid, etc.

The esterification of my polyhydric alcohols may be carried out in an inert atmosphere of carbon dioxide or nitrogen if desirable and at temperatures from about 140° C. to 220° C. If a volatile acid or if a volatile alcohol be present, the reaction may be carried out under reflux and in some instances, it is desirable that the reaction be carried out azeotropically and preferably with a water trap for separating the water formed during the esterification from the reflux condensate. It is also advantageous to add some organic distilling medium to the reactants which are non-volatile in order to minimize any tendency to gel and also to aid in the separation of the water formed by the esterification. For this purpose, inert organic solvents such as benzene, toluene, ethylene dichloride, phenol, etc., may be used. If an organic distilling medium be employed, the reaction is carried out substantially under azeotropic conditions and a water trap is provided for the separation of the water of esterification.

The proportion of my plasticizer may be varied considerably. For best results it is preferable that about 40% to 60% of polyhydric alcohol based on the resin content of the solution be used, but this amount may be varied above or below this range according to the hardness desired.

Various dyes or pigments may be incorporated in the compositions containing an amino resin and a plasticizer of the type described herein. Examples of these are: titanium oxide, ferric oxide, Prussian blue, toluidine red, chrome green, chrome yellow, etc.

If desirable, acid or basic catalysts, e. g., phosphoric acid, phthalic acid, sodium carbonate, etc., may be included in the compositions in order to harden the amino resin more rapidly in accordance with principles known in the art.

Plasticizers such as dibutyl phthalate and other alkyl esters of phthalic acid, tricresyl phosphate, toluene sulfonamid, etc., may also be included in the compositions described above if desirable.

Among the resins which may be plasticized with the glycols described herein are those obtained by reacting an aldehyde, e. g., formaldehyde, polymers of formaldehyde, acetaldehyde, benzaldehyde, etc., with one or more of the following: urea, thiourea, aminotriazines such as melamine, dicyandiamide, guanidine, the reaction products obtained by heating and decomposing dicyandiamide, etc. Phenol and the substituted phenols such as the alkyl phenols may be included with any of the various amino compounds just mentioned. Mixed resins such as urea-melamine-formaldehyde resins, urea-thiourea-formaldehyde resins, etc., may be prepared by reacting the aldehyde with each of the other reactants separately and mixing the resulting products or the aldehyde may be reacted with a mixture of the other reactants.

In the production of urea-formaldehyde resins it is preferable that the formaldehyde to urea ratio be between about 2:1 and 3:1 whereas in the preparation of melamine-formaldehyde resins it is preferable that the formaldehyde to melamine ratio be between about 3:1 and 6:1. Higher or lower ratios may, of course, also be employed.

These amino resins are preferably alkylated with a suitable alcohol e. g., ethanol, propanol, butanol, amyl alcohol, cyclohexanol, benzyl alcohol, etc. To prepare alkylated amino resins, the amino compound such as urea is generally condensed with an aqueous solution of formaldehyde and the alcohol which is to be used for alkylation is added to the resulting aqueous syrup. The mixture is then azeotropically distilled and the water is separated by means of a suitable water trap. Usually the alkylated resins are dissolved in, or diluted with, organic solvents such as the alcohols just mentioned, xylene, toluol, etc.

My new plasticizers together with an amino resin are particularly useful in coating compositions to be applied wherever maximum water and alkali resistance are required, e. g., on bottle cap liners, protective coatings for food and beverage containers, etc. They are also of use in the general field of coating compositions containing amino-formaldehyde resins. In such applications my plasticizers may replace part or all of the alkyd resins usually included in such compositions. My plasticizers may also be used in textile treating, paper treating, laminating, and molding compositions.

Obviously many modifications and variations in the processes and compositions described above may be made without departing from the spirit and scope of the invention as defined in the appended claims.

I claim:

1. A resinous amino-aldehyde condensation product plasticized with a high molecular weight alcohol, obtained by polymerizing at elevated temperature a substance selected from the group consisting of polyene fatty acids and their esters and hydrogenating the polymer to the corresponding alcohol.

2. A resinous amino-aldehyde condensation product plasticized with a high molecular weight alcohol, obtained by polymerizing at elevated temperature a substance selected from the group consisting of polyene fatty acids and their esters and hydrogenating the polymer to the corresponding alcohol in the presence of a hydrogenolysis catalyst.

3. A resinous amino-aldehyde condensation product plasticized with a high molecular weight alcohol obtained by polymerizing at elevated temperature a substance selected from the group consisting of polyene fatty acids and their esters and hydrogenating the polymer to the corresponding alcohol in the presence of a copper chromite catalyst.

4. A resinous urea-formaldehyde condensation product plasticized with a high molecular weight alcohol obtained by polymerizing at elevated temperature the methyl esters of tung oil fatty acids and hydrogenating the polymer to the corresponding alcohol in the presence of a copper chromite catalyst.

5. A resinous urea-formaldehyde condensation product plasticized with a high molecular weight alcohol obtained by polymerizing at elevated temperature the methyl esters of the fatty acids of soya-bean oil and hydrogenating the polymer to the corresponding alcohol in the presence of a copper chromite catalyst.

6. A resinous melamine-formaldehyde condensation product plasticized with a high molecular weight alcohol obtained by polymerizing at elevated temperature the methyl esters of the fatty acids of dehydrated castor oil and hydrogenating the polymer to the corresponding alcohol in the presence of a copper chromite catalyst.

7. A resinous alkylated urea-formaldehyde condensation product plasticized with a high molecular weight alcohol obtained by polymerizing at elevated temperature the methyl esters of the fatty acids of soya-bean oil and hydrogenating the polymer to the corresponding alcohol in the presence of a copper chromite catalyst.

8. A resinous alkylated melamine-formaldehyde condensation product plasticized with a high molecular weight alcohol obtained by polymerizing at elevated temperature the methyl esters of the fatty acids of dehydrated castor oil and hydrogenating the polymer to the corresponding alcohol in the presence of a copper chromite catalyst.

9. A resinous butylated urea-formaldehyde condensation product plasticized with a high molecular weight alcohol obtained by polymerizing at elevated temperature the methyl esters of the fatty acids of soya-bean oil and hydrogenating the polymer to the corresponding alcohol in the presence of a copper chromite catalyst.

10. A resinous butylated melamine-formaldehyde condensation product plasticized with a high molecular weight alcohol obtained by polymerizing at elevated temperature the methyl esters of the fatty acids of dehydrated castor oil, and hydrogenating the polymer to the corresponding alcohol in the presence of a copper chromite catalyst.

11. A resinous amino-aldehyde condensation product plasticized with a substance containing a high molecular weight alcohol radical, said alcohol being obtained by polymerizing at elevated temperature a substance selected from the group consisting of polyene fatty acids and their esters and hydrogenating the polymer to the corresponding alcohol.

WILLIAM B. JOHNSTON.

CERTIFICATE OF CORRECTION.

Patent No. 2,311,341. February 16, 1943.

WILLIAM R. JOHNSTON.

It is hereby certified that error appears in the printed specification of the above numbered patent requiring correction as follows: Page 1, first column, line 51, before the word "be" strike out "can"; page 3, second column, line 17, in the formula, for "$C_{36}H_{70}(CH)_2$" read --$C_{36}H_{70}(OH)_2$--; and that the said Letters Patent should be read with this correction therein that the same may conform to the record of the case in the Patent Office.

Signed and sealed this 6th day of April, A. D. 1943.

(Seal)

Henry Van Arsdale,
Acting Commissioner of Patents.